United States Patent
Jones et al.

(10) Patent No.: US 10,126,061 B1
(45) Date of Patent: Nov. 13, 2018

(54) LOCALIZED STRENGTHENING OF FEATURES FOR A SAPPHIRE COMPONENT

(71) Applicant: APPLE INC., Cupertino, CA (US)

(72) Inventors: Christopher D. Jones, Cupertino, CA (US); Dale N. Memering, Cupertino, CA (US); Matthew S. Rogers, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 500 days.

(21) Appl. No.: 14/628,969

(22) Filed: Feb. 23, 2015

Related U.S. Application Data (60) Provisional application No. 62/043,214, filed on Aug. 28, 2014.

(51) Int. Cl.
*C03C 25/62* (2018.01)
*F27D 5/00* (2006.01)

(52) U.S. Cl.
CPC ............................. *F27D 5/00* (2013.01)

(58) Field of Classification Search
CPC . C03C 25/6233; C03C 25/002; C03C 23/007; C03C 23/0025; C03C 23/0055; C30B 33/02; B23K 26/0066
See application file for complete search history.

(56) References Cited

U.S. PATENT DOCUMENTS

| | | | | |
|---|---|---|---|---|
| 2,584,427 A * | 2/1952 | Craston | ..................... | H01J 5/24 65/36 |
| 4,338,114 A * | 7/1982 | Brockway | .......... | B23K 26/0075 219/121.65 |
| 4,547,256 A * | 10/1985 | Gurtler | ................... | C30B 13/22 117/3 |
| 4,731,254 A * | 3/1988 | Heineken | ............... | C03B 29/02 219/121.64 |
| 4,888,302 A * | 12/1989 | Ramesh | ............. | H01L 21/2022 117/44 |
| RE33,274 E * | 7/1990 | Burnham | ............... | B82Y 20/00 148/DIG. 84 |
| 5,427,825 A * | 6/1995 | Murnick | ............... | B28B 11/044 427/279 |
| 5,697,998 A * | 12/1997 | Platus | ..................... | C03B 29/00 65/104 |
| 2007/0014949 A1 * | 1/2007 | Bhatnagar | ......... | H01L 21/67115 428/34.4 |
| 2007/0040001 A1 * | 2/2007 | Ishikawa | .................. | B23K 9/04 228/101 |
| 2012/0164411 A1 * | 6/2012 | Hilmas | ............. | C04B 35/58078 428/212 |
| 2013/0220523 A1 * | 8/2013 | Cheney | ..................... | C23C 4/08 156/215 |

* cited by examiner

*Primary Examiner* — Nathaniel Herzfeld
(74) *Attorney, Agent, or Firm* — Dorsey & Whitney LLP (57) ABSTRACT

Methods and systems for localized strengthening of features of a component formed from a sapphire material include a combination of holistic heating and localized surface heating. In one example, the localized heating may occur via laser thermal, flame polishing, hot wire heating, plasma etching, or chemical treatment. By combining the localized surface heating with holistic heating, near-melt or melt processing in a localized area can be achieved while avoiding overheating of well-polished areas, and therefore minimizing defects that would otherwise be caused by excessive heating. This may be used for strengthening features of components formed from sapphire material that are difficult to polish, such as non-planar features.

20 Claims, 8 Drawing Sheets

LOCALIZED STRENGTHENING OF FEATURES FOR A SAPPHIRE COMPONENT

CROSS-REFERENCE TO RELATED APPLICATION

This application is a nonprovisional patent application of and claims the benefit to U.S. provisional Patent Application No. 62/043,214, filed Aug. 28, 2014 and titled "Localized Sapphire Strengthening of Features," the disclosure of which is hereby incorporated herein by reference in its entirety.

TECHNICAL FIELD

The subject matter of this disclosure relates generally to manufacturing sapphire parts, and more particularly to strengthening localized areas of sapphire parts that may be used as protective covers for portable electronic devices.

BACKGROUND

Corundum is a crystalline form of aluminum oxide and is found in various different colors, most of which are generally referred to as sapphire. Sapphire is a hard and strong material with a hardness of 9.0 on the Mohs scale, and, as such, is capable of scratching nearly all other minerals. Because of its hardness and strength, sapphire may be an attractive alternative to other translucent materials like glass or polycarbonate. However, due to its brittle nature, sapphire is susceptible to dramatic strength reductions as a result of small defects in the surface or edge of the part. It is generally desirable to minimize small defects that may occur during manufacturing to produce a sapphire part that is durable and long lasting.

Manufacturing a near defect-free sapphire part may present unique challenges. The strength of a brittle material, such as sapphire, is limited due to flaw population on the surface or edges of the part. An inconsistent or inadequate surface or edge finish can lead to the propagation of micro cracks and result in a weakened part. Traditional translucent materials like silicate glass are able to be chemically strengthened to a significant depth to minimize the effect of these flaws, but on extremely hard materials such as sapphire, a similar process is not readily available. Additionally, sapphire's hardness makes cutting and polishing the material both difficult and time consuming when conventional processing techniques are implemented.

SUMMARY

One example embodiment is directed to a method of strengthening and/or repairing a component formed from a sapphire material. A component may be formed from a substrate. The component may be heated at least to a substantially uniform elevated temperature. Before the component cools below a first temperature, the component may be treated in a localized area to increase the temperature of the component in the localized area relative to the rest of the component, thereby strengthening the component within the localized area. Treating the localized area may include directing a laser beam onto the localized area, applying a flame (e.g., from a flame torch) onto the localized area, placing a hot wire on or near the localized area, bombarding the localized area with ions (e.g., using a plasma torch), or applying chemicals to the localized area.

In another embodiment, a component formed from a sapphire material may be provided, where the component includes a first feature having a polished surface and a second feature having a surface that is rougher than the polished surface. The component may be heated at least to a uniform elevated temperature, where the elevated temperature is below a temperature that will degrade the polished surface. The second feature of the component may be treated (e.g., using a laser, flame, hot wire, ion beam, or chemicals) to increase the temperature of the second feature above the elevated temperature. The component may be cooled to the ambient temperature, thereby strengthening the second feature without degrading the polished surface of the first feature.

In another embodiment, a component formed from a sapphire material may be heated in a heated furnace at least until the component reaches a uniform elevated temperature. A crack in a localized area of the component may be repaired by treating the localized area of the component (e.g., using a laser, flame, hot wire, ion beam, or chemicals) to increase the temperature of the component in the localized area to a temperature that is above the elevated temperature and above a brittle-ductile transformation temperature of the component.

In another embodiment, a component formed from a sapphire material may be provided. The sapphire part may be placed in a heating device, such as a furnace. The temperature of the component may be increased, in the heating device, to a substantially uniform elevated temperature. While the temperature of the component is at the substantially uniform elevated temperature, the component may be treated in a localized area (e.g., using a laser, flame, hot wire, ion beam, or chemicals) to increase the temperature of the component in the localized area to a temperature that is above the elevated temperature. The component may be cooled to the ambient temperature, thereby strengthening the component within the localized area. The component may be attached to a front of the portable electronic device.

In some embodiments, a component that is strengthened using embodiments of the present disclosure may be installed as a protective cover on a portable electronic device. In some cases, the portable electronic device is any one of: a mobile telephone, a portable media player, a wearable device, or a tablet computing device.

One example embodiment is directed to a system for strengthening a component formed from a sapphire material. The system includes a heating device that is configured to heat the component, and a second device to provide a localized treatment to the component.

Other embodiments are disclosed herein. The features, utilities and advantages of various embodiments of this disclosure will be apparent from the following more particular description of embodiments as illustrated in the accompanying drawings.

DETAILED DESCRIPTION

Numerous consumer and non-consumer devices utilize protective coverings, windows, and/or surfaces formed from hard materials like sapphire. Compared to other optically clear materials such as silicate glass, sapphire offers improved scratch resistance and strength. However, as previously mentioned, sapphire is also relatively brittle and may fail if minor defects are present in a sapphire part. As discussed herein, in accordance with various embodiments, sapphire parts can be manufactured and strengthened using processes that use holistic heating (e.g., heating of all or substantially all of a sapphire part) combined with localized treatment steps to strengthen areas, regions, or features of the sapphire part such as but not limited to edges, corners, curves, grooves, holes, or other non-planar surfaces.

Thermal annealing may be used to strengthen single crystal materials such as sapphire. Thermal annealing strengthens the sapphire material by heating the sapphire to a certain internal temperature, and then allowing it to cool at a certain rate, resulting in stress relaxation, defect recombination, and bond re-arrangement. In an industrial manufacturing setting, thermal annealing may be effective on sapphire with a relatively well polished surface such as a planar or a flat surface; however, in some cases, unpolished surfaces (such as surfaces that are difficult to polish such as edges, curves, corners, grooves, holes, or other features), thermal annealing can be problematic due to variations in treatment time, treatment temperature, geometry preservation concerns, and the creation of unwanted defects which may be introduced during the annealing process. For example, 3D geometry sapphire parts with planar and non-planar surfaces or features (such as edges, corners, curved surfaces, grooves, holes, etc.) may include various degrees of surface finish and polish due to physical geometrical constraints affecting polishing efficiency and capability. For each degree of surface finish, there may be optimal strengthening anneal parameters (e.g., times, temperatures, heating/cooling rates, etc.) to address these concerns. However, the optimal strengthening anneal parameters for one portion of a sapphire part (e.g., an edge, corner, etc.) may be potentially damaging to another portion of the sapphire part (e.g., a polished planar surface). As a specific example, annealing a part using annealing parameters that are sufficient to strengthen an unpolished edge of the part may result in damage to or degradation of the degree of polish of a polished surface. Thus, simply annealing the entire part to strengthen the unpolished surface may not be suitable.

Additionally, correcting certain defects or strengthening certain geometries in a sapphire part may require temperatures higher than those that are used for annealing. For example, in order to repair a crack in a sapphire part, it may be necessary to heat the part to near or above the melting point of the sapphire so as to allow the sapphire to reflow into the crack. It may be difficult or impossible, however, to heat the entire sapphire part to the melting point (or near the melting point) without changing the overall geometry or surface finish of the part. In particular, if thermal annealing alone were applied to the sapphire part for a sufficient time and at a sufficient temperature to strengthen the edges, corners or other features of a sapphire part (or otherwise repair certain local defects), visible irregularities and imperfections would develop in the planar areas of the sapphire part, which are highly undesirable. Yet large temperature gradients in the part may damage the part. For example, temperature gradients caused by heating only the portion of the sapphire that is desired to be strengthened or repaired may cause the sapphire to crack or break. Therefore, there is a need to be able to locally strengthen features or repair defects in a sapphire part without damaging other portions of the part.

In some embodiments described herein, a method of localized strengthening of features on a sapphire device includes a combination of holistic heating and localized heating. In one example, the localized heating may occur via thermal laser, flame polishing, hot wire heating, plasma etching, or chemical treatment. By combining the localized surface heating with holistic heating, temperatures sufficient to effect the desired repair in a localized area can be achieved while avoiding overheating of well-polished areas, therefore minimizing defects that would otherwise be caused by localized heat treatment alone and/or full annealing. This is particularly useful for strengthening the features of a sapphire part that are difficult to polish, such as non-planar features, or features that are cracked or are otherwise in need of repair. Additionally, embodiments of the present disclosure can avoid large temperature gradients within the part. Embodiments of the present disclosure can also avoid large scale surface reflow and changes in part geometry by constraining high-temperature heat treatment (e.g., melt or near-melt processing) to the desired areas in the features to be strengthened.

In order to address these issues, various embodiments of this disclosure are described which include a multi-step process to strengthen or repair a sapphire part.

1. Devices with Sapphire Parts Such as Protective Cover Sheets

In accordance with various embodiments, FIGS. 1A-1D depict a device having multiple protective sheets on the exterior of the device. In the present example, the protective sheets are formed from one or more sapphire parts, which provide outstanding scratch resistance and enhance the mechanical integrity of the device. A protective sheet may also function as an optically transmissive window and provide visibility to underlying components, such as display screens or graphical elements. In a typical implementation, both the optical and mechanical properties of the protective sheets may be important to perception of quality and performance of the device.

Figure 1A:
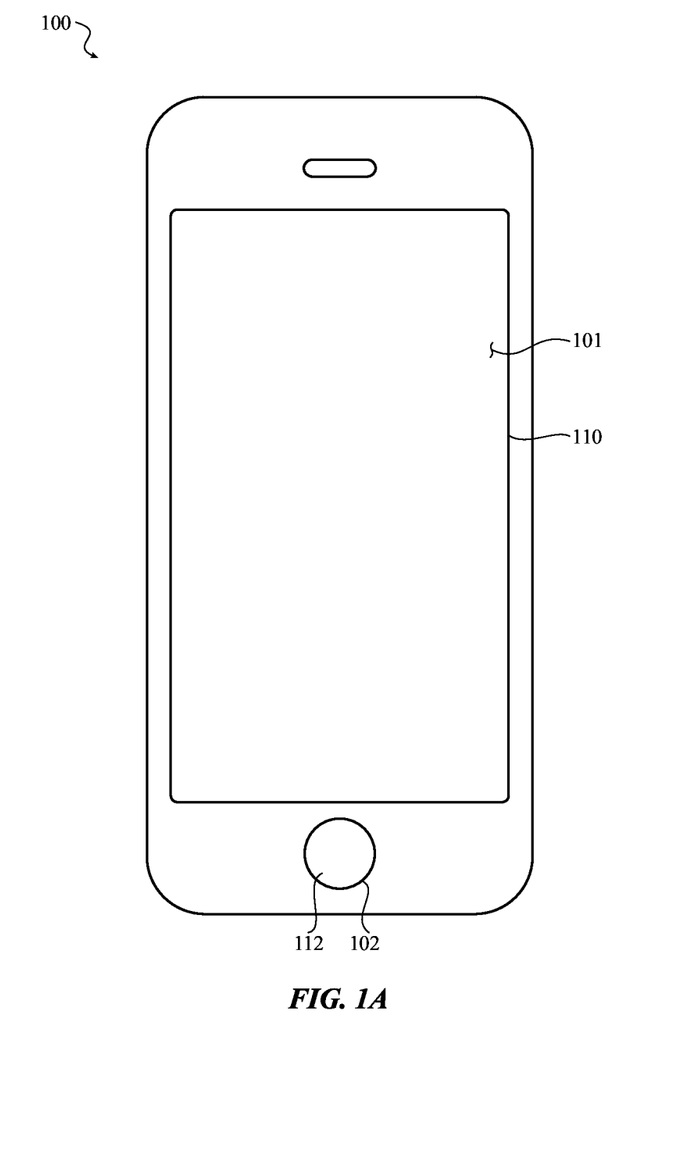
FIG. 1A depicts the front of a sample electronic device.

As shown in FIG. 1A, the device 100 includes protective cover sheet 101 formed from a sapphire part and used as an optically transmissive protective layer. The cover sheet 101 is typically attached to the device 100 using an optically transmissive adhesive or other bonding technique. For example, the cover sheet 101 may be attached using a pressure sensitive adhesive (PSA) film. As another example, a channel 120 (FIG. 1B, 1D) may be machined or otherwise formed around the perimeter of the cover sheet 101 in which an adhesive may be introduced. The cover sheet 101 may be attached to the face of the display screen 110 and protect the display screen 110 from scratches or other physical damage. The display screen 110 may include a liquid crystal display (LCD), organic LED display, or similar display element. Because the cover sheet 101 overlays the display screen 110, optical clarity and physical strength are important aspects of the cover sheet's functionality. The cover sheet 101 may also be attached to, or be integrated with, a transparent electronic sensor that overlays the display screen 110. In some cases, the electronic sensor covers the entire display screen 110 and is used as the main input device for the user. In some implementations, the cover sheet 101 may be integrated with a capacitive touch sensor used to detect finger or stylus touches on the surface of the cover sheet 101.

The cover sheet 101, depicted in FIG. 1A, is formed from a sapphire part having an overall thickness of less than 3 mm in one example. In some embodiments, the overall thickness of the cover sheet 101 is between approximately 0.1 mm and 1 mm. However, in some embodiments, the sapphire part may have a thickness greater than 3 mm or less than 0.1 mm. Moreover, the sapphire part may be formed into a variety of non-sheet shapes, including parts that have multiple features of different thicknesses.

The cover 101 may be formed from a single sheet of sapphire material or, alternatively, be formed from a laminate material made from multiple layers and having at least one layer formed from a sheet of sapphire. In the present example, one side of the cover sheet 101 is printed with a solid, opaque border around a perimeter portion. The center portion of the cover sheet 101 remains optically transmissive. The printed side of the cover sheet 101 is typically the side that is opposite the external face of the device 100 to prevent the printed portion from becoming scratched or damaged. The side of the cover sheet 101 that is external to the device may include an anti-reflective or other type of coating to enhance the optical properties of the cover sheet 101.

As shown in FIG. 1A, the front surface of the device 100 also includes a button sheet 102 used to protect the surface of the control button 112. In this example, the button sheet 102 is formed from a sapphire sheet and is used as an optically transmissive protective layer. The button sheet 102 protects the surface of a control button 112 and allows visibility of any graphical elements that are printed on the control button 112. In some cases, it is not necessary that the button sheet be optically transmissive. For example, the button sheet 102 may be opaque and an outer surface of the button sheet 102 may be printed with a graphical element or symbol. In this case, the button sheet 102 is a flat sheet, but in other embodiments, the button sheet may be formed as or include a contoured or curved surface.

The button sheet 102 may enhance the mechanical strength of control button 112, which is used as an input to the device 100. In the present example, the control button 112 includes a tactile switch which is operated by depressing the control button 112. The control button 112 may also include or be associated with an electronic touch sensor, such as a capacitive touch sensor or biometric sensor. The button sheet 102 may be attached directly to a housing of the control button 112 and may, alternatively, be attached to or integrated with the electronic touch sensor of the control button 112.

In certain embodiments, the button sheet 102 depicted in FIG. 1A is formed from a sapphire sheet having an overall thickness of less than 3 mm and, in some embodiments, between approximately 0.1 mm and 1 mm. Other thicknesses and dimensions are also envisioned. Similar to the cover sheet 101, the button sheet 102 may be formed from a single sheet of sapphire material or, alternatively, be formed from a laminate material having at least one layer formed from a sheet of sapphire. In some cases, the button sheet 102 is formed from the same material as the cover sheet 102, although this is not necessary. One or both sides of the button sheet 102 may also be printed or coated to enhance the optical properties of the sapphire part.

Figure 1B:
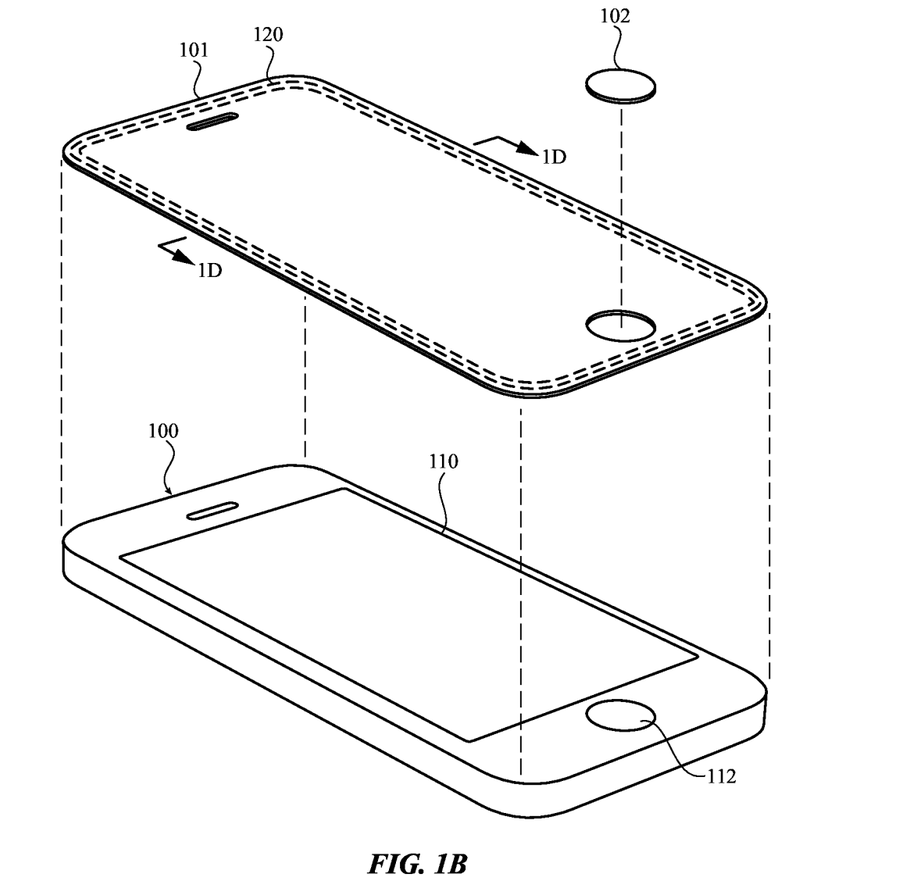
FIG. 1B depicts an exploded front view of a sample electronic device.
Figure 1C:
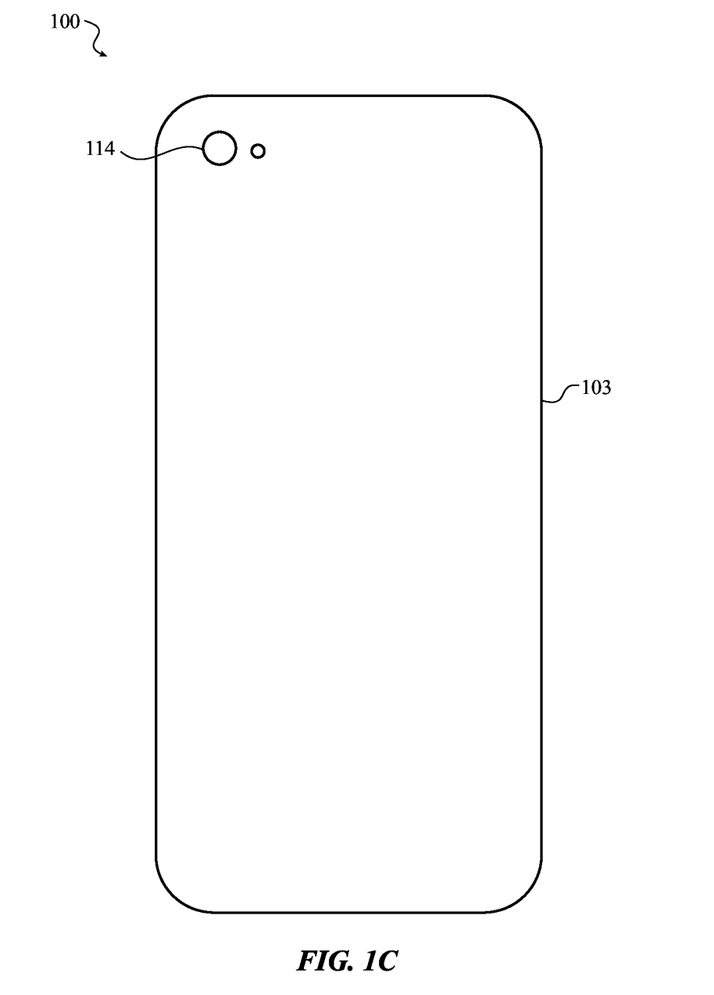
FIG. 1C depicts the back of a sample electronic device.

FIG. 1C depicts an exploded view of the device 100, showing the cover sheet 101 and the button sheet 102 removed from the device 100. As shown in FIG. 1C, the back surface of the device 100 is protected by a back sheet 103. Similar to the cover sheet 101, the back sheet 103 is also formed from a sapphire part and is used as an optically transmissive protective layer. Also, similar to the cover sheet 101, the back sheet 103 may be formed from a single sheet of sapphire material or, alternatively, be formed from a laminate material having at least one layer formed from a sheet of sapphire. In this case, the back sheet 103 covers the entire back of the device 100, except for the area near the camera lens 114. A separate sapphire part may be used to protect the camera lens 114. In an alternative embodiment, the back sheet 103 also covers the camera lens 114 and a separate sapphire part is not used.

Figure 1D:
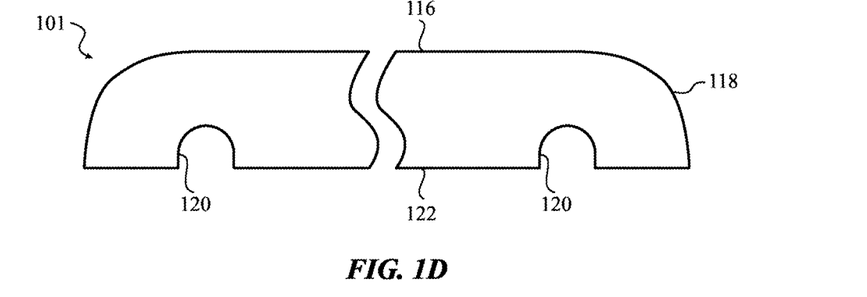
FIG. 1D depicts a cross section of an example of a sapphire part with several distinct portions that may be strengthened using embodiments of the present disclosure.

FIG. 1D depicts a cross section of the cover sheet 101 taken across line 1D in FIG. 1B. The cover sheet 101 includes various different portions corresponding to different geometric features. For example, the cover sheet 101 includes a first planar surface 116 (e.g., corresponding to a front surface of the cover sheet 101), a second planar surface 122 (e.g., corresponding to a back surface of the cover sheet 101), a rounded edge 118, and a groove 120. Features may each include a different degree of surface finish and/or polish. For example, the first and second planar surfaces 116, 122 may be highly polished, the rounded edge 118 may be moderately polished, and the groove 120 may be unpolished. The degree of surface finish and/or polish may correspond to the roughness of the surface, rather than the use of any particular polishing or machining process. Thus, an unpolished surface may be rougher than a polished surface.

The features identified above are merely exemplary, and different parts may have different features. In some embodiments, features are consistent with boundaries between different surface finishes and/or polishes. In other words, any contiguous area of a certain surface finish may be considered a feature. Thus, a single plane may include multiple features if the plane has distinct areas of different surface finishes and/or degrees of polish.

In the example device 100 shown in FIGS. 1A-1D, the protective cover sheets (101, 102, 103) are formed from a crystalline form of alumina ($Al_2O_3$), also referred to as corundum. The sheet(s) may range in thickness from about 0.1 mm to 3 mm and may have a hardness of approximately 9.0 on the Mohs scale, although alternative embodiments may have sheet(s) of different thickness(es). As discussed above, any one of the protective cover sheets (101, 102, 103) may be formed as a laminate of multiple sheets of material and may also be coated with one or more materials to enhance the optical or mechanical properties of the part. In some cases, it may be beneficial to form all of the protective cover sheets (101, 102, 103) from the same sapphire substrate to simplify the manufacturing process. However, different types of sapphire substrates may be used for each cover sheet, depending on the optical and/or mechanical properties desired for each piece.

As shown in FIGS. 1A-D, the device 100 is a portable electronic device. The device 100 may be any one of a variety of devices utilizing a hard substrate as a covering, window, and/or surface. For example, the device 100 may be a portable electronic device, such as a mobile phone, portable media player, or other handheld appliance. Similar types of protective covers may be applied to other electronic devices, including, for example, tablet computers, notebook computers, and wearable devices. Additionally, the protective covers may be applied to other types of devices including non-electronic devices, such as mechanical watches that utilize an optically transmissive face over the dial. Alternatively, the protective covers may be integrated with any device that includes a hard exterior surface, particularly if the surface includes a display screen, camera, or other optical element.

2. Methods for Strengthening a Sapphire Part

Manufacturing processes used to create parts from sapphire material may result in parts with flaws or micro cracks. Those flaws or cracks may propagate through the part over time resulting in premature mechanical failure. Therefore, it is generally beneficial to manufacture sapphire parts (e.g., cover sheets for electronic devices, such as sheets 101, 102, and/or 103) in a way that minimizes flaws or micro cracks. The manufacturing system and methods described below may be used to strengthen a sapphire part that is designed to have a level of quality and reliability sufficient to function as a protective cover on an electronic device.

FIGS. 2-5 depict various exemplary processes that can be used to strengthen and/or repair components formed from a sapphire material. For purposes of description, a component formed from a sapphire material may also be referred to herein as a sapphire part. The processes may be implemented on, for example, the system 600 described below with respect the FIG. 6. Also, the sapphire part that is processed according to these processes may be used as a protective cover sheet on a device in accordance with the examples provided above with respect to FIGS. 1A-D. The processes can also be used to produce a sapphire part used in a variety of other applications, including structural laminates, optical plates, optical lenses, and the like.

Generally, a sapphire substrate is obtained and a sapphire part is formed therefrom. The sapphire substrate may include a sheet of sapphire material less than 3 mm thick and may be obtained from a variety of sources, natural and/or synthetic. As one non-limiting example, the sapphire substrate may be a sheet between approximately 0.1 mm and 1 mm in thickness cut from a cylindrical boule of sapphire material. In some cases, the sapphire substrate may be a laminate composite having multiple layers and at least one layer made from a sapphire material. Other layers in the sapphire substrate laminate may include, for example, silicate glass, a polymer sheet, or additional layers of sapphire material. The sapphire substrate may also include one or more coatings to improve the optical or mechanical properties of the substrate.

Figure 2:
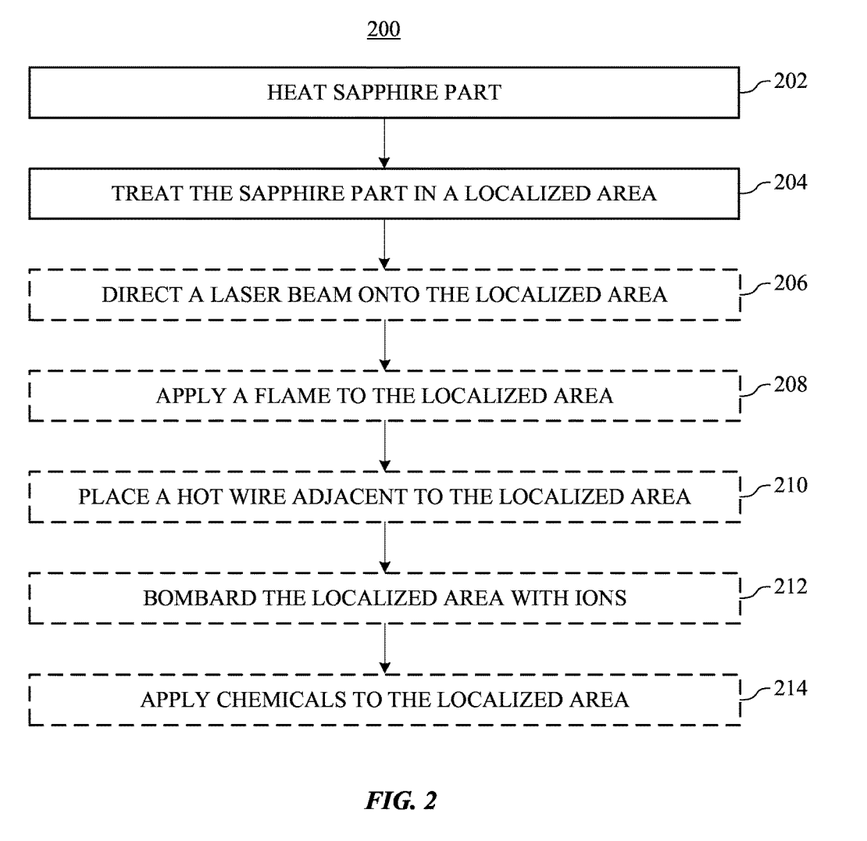
FIG. 2 depicts an example process for strengthening a sapphire part, in accordance with one embodiment of the present disclosure.

FIG. 2 illustrates a process 200 for strengthening and/or repairing a sapphire part. The process 200 may be used to strengthen or repair a part such as the cover sheets 101, 102, 103 described above, though the process 200 may be used to strengthen or repair other sapphire parts as well. As shown and described, the process 200 includes several steps. It will be understood that the process 200 may include more or fewer steps than those described. Moreover, in various embodiments, the steps may be reordered, combined, and/or omitted, and steps from other processes (e.g., processes 300, 400, 500) may be included in the process 200.

At operation 202, the sapphire part is heated. In some embodiments, the sapphire part is heated by placing the sapphire part in a heated furnace or other heating device. In some embodiments, at operation 202, the sapphire part is heated to a substantially uniform elevated temperature. For example, the sapphire part is heated until the internal temperature of all or substantially all of the sapphire part is at or near a desired temperature. When the sapphire part is heated at operation 202, any appropriate heating and/or cooling profile(s) may be used to reach the elevated temperature. For example, the part may be heated from an ambient temperature (e.g., a room temperature) to the elevated temperature. As another example, the part may be heated from an ambient temperature to a temperature between an ambient temperature and the elevated temperature, and then further heated to the elevated temperature. As yet another example, the part may be heated from an ambient temperature to a temperature above the elevated temperature, and then cooled to the elevated temperature. Any other heating and/or cooling profiles may be implemented instead or in addition to those mentioned above.

In some embodiments, the elevated temperature to which the sapphire part is heated at operation 202 may be selected as the highest temperature that will not (or is predicted to not) result in damage to certain features of the sapphire part. Damage to a feature may include any undesirable change in a property of the feature, such as a change in strength, surface finish/polish, geometry, crystalline structure, or the like. For example, if the temperature of a polished surface of a sapphire part is increased above a certain threshold temperature, the surface may become more rough, thus damaging the polished surface. As another example, if the temperature of a groove is increased above a certain threshold temperature, the geometry of the groove may be changed in an undesirable way, thus damaging the groove.

In some embodiments, the elevated temperature to which the sapphire part is heated at operation 202 may be selected based on one or more threshold temperatures of sapphire material. For example, the elevated temperature may be based on an annealing temperature of sapphire. As another example, the elevated temperature may be based on a brittle-ductile transformation temperature of sapphire (a temperature above which plastic deformation, or permanent reshaping, of the material will occur). In some embodiments, the brittle-ductile transformation temperature of sapphire is around 1000° C. Where the elevated temperature is selected based on one or more threshold temperatures, the elevated temperature may be selected to be a certain amount below a threshold temperature. For example, the elevated temperature may be 1%, 5%, 10%, 20% (or any other appropriate amount) below a threshold temperature of the sapphire part. As another example, the elevated temperature may be 5° C., 10° C., 100° C., 200° C., 500° C., or 1000° C. (or any other amount) below a threshold temperature of the sapphire part.

In some embodiments, the elevated temperature to which the sapphire part is heated at operation 202 is selected based on individual threshold temperatures of one or more features of a sapphire part. For example, as described above with respect to FIG. 1D, a sapphire part may include multiple different features, each having different a geometry, surface finish/polish, and the like. Accordingly, each feature may have a different threshold temperature that will result in damage to one or more aspects of the feature (e.g., an undesirable change in the surface polish, geometry, strength, etc.). For example, the planar surface 116 may be damaged if its temperature is increased above 500° C., whereas the rounded edge 118 may be able to withstand an internal temperature of 1500° C. before it is likely to incur damage. (These temperatures are merely exemplary, and are used simply to demonstrate the differences in threshold temperatures between different features.) Moreover, the threshold temperature for a given feature may depend on the type of damage that is to be avoided for that feature. For example, the threshold temperature for the planar surface 116 may be a temperature above which the surface polish is likely to be degraded, whereas the threshold temperature for the groove 120 may be a temperature above which the geometry of the groove is likely to be substantially altered.

In some embodiments, the elevated temperature to which the sapphire part is heated in operation 202 is selected based on the lowest threshold temperature among multiple different features. Specifically, for a particular sapphire part, threshold temperatures are identified for different portions of the part. The elevated temperature is then selected based on the lowest threshold temperature from among the different features. As noted above, the elevated temperature may be a certain amount below the lowest threshold temperature. For example, the elevated temperature may be 1%, 5%, 10%, 20% (or any other appropriate amount) below the lowest threshold temperature of the sapphire part. As another example, the elevated temperature may be 5° C., 10° C., 100° C., 200° C., 500° C., or 1000° C. (or any other amount) below the lowest threshold temperature of the sapphire part.

As a specific example, with reference to FIG. 1D, threshold temperatures for features 116, 118, 120, and 122 may be determined. The threshold temperatures may correspond to temperatures that the features should not exceed if damage to the part is to be avoided. For example, with reference to FIG. 1D, if the threshold temperatures for features 116, 118, 120, and 122 of FIG. 1D are 1000° C., 1500° C., 1800° C., and 1100° C., respectively, then the elevated temperature to which the part 101 is heated, when undergoing a strengthening process as described herein, is selected to be less than 1000° C.

At operation 204, before the sapphire part cools below a first temperature (e.g., while the part is being heated or is heated as a result of operation 202), the sapphire part is treated in a localized area to increase the temperature of the sapphire part in the localized area relative to the rest of the sapphire part, thereby strengthening the sapphire part within the localized area. In some embodiments, the first temperature is equal to the elevated temperature. In other embodiments, the first temperature is 1° C., 2° C., 5° C., 10° C., 50° C., 75° C., 100° C., or any other appropriate number of degrees lower than the elevated temperature.

Because the temperature of the localized area is increased while the sapphire part is still heated as a result of the heating operation 202, the temperature gradients in the sapphire part may be less than would otherwise be developed within the part if the localized treatments were performed while the remainder of the sapphire part was at ambient (e.g., room) temperatures. Accordingly, the risk of fracturing or damaging the sapphire part is reduced while allowing high-temperature treatment for repair or strengthening of localized areas.

The localized treatment may increase the temperature of the sapphire part in the localized area to a second temperature. In some embodiments, the second temperature is above the brittle-ductile transformation temperature of the sapphire part (e.g., around 1000° C.). In some embodiments, the second temperature is at or above a melting point of the sapphire part (e.g., around 2,030° C. to 2,053° C.).

In some embodiments, the difference between the first temperature and the second temperature is less than a maximum temperature gradient for the sapphire part. In particular, the maximum temperature gradient may be a temperature gradient within the sapphire part that presents an unacceptable risk that the sapphire part will crack, break, or otherwise be damaged as a result of thermal shock. For example, the maximum temperature gradient may correspond to a maximum amount of thermal expansion of the sapphire part that the sapphire part can incur without structural failure (e.g., cracking, breaking) of the sapphire material. In some embodiments, the maximum temperature gradient may be 50° C., 100° C., 500° C., 1000° C., or any other temperature gradient. Accordingly, the second temperature may be selected so that the temperature gradient between the localized area and the remainder of the sapphire part is less than the maximum temperature gradient.

In some embodiments, treating the sapphire part in the localized area at operation 204 includes directing a laser beam onto the localized area (also referred to as the target area) in order to increase the temperature of the localized area to the second temperature (206). In some embodiments, energy from the laser beam (e.g., a bombardment of photons) causes the sapphire material in the target area to be heated to the melting temperature of sapphire (or near or above the melting temperature), causing the sapphire to melt or otherwise reflow in order to correct the defect or strengthen the target area.

Instead of or in addition to increasing the temperature of the localized area with the laser, short pulses from a laser beam can be directed onto the target area, wherein the pulses from the laser beam remove material from the localized area receiving the laser treatment (e.g., laser ablation).

In some embodiments, treating the sapphire part in the localized area at operation 204 includes applying a flame to the localized area in order to increase the temperature of the localized area to the second temperature (208). For instance, an oxy-acetylene torch (or other suitable flame torch, including any oxy-fuel torch) can be used to apply heat to the localized area of the sapphire part.

In some embodiments, treating the sapphire part in the localized area at operation 204 includes placing a hot wire adjacent to the localized area to increase the temperature of the localized area to the second temperature (210). For instance, a unitary wire, set of wires, array of wires, wire mesh, or other arrangement of wires, can be positioned adjacent to the area of the sapphire part that is desired to be heated and strengthened. The wire can be heated to a temperature sufficient to heat the localized area and induce healing of imperfections within the localized area of the sapphire part.

In some embodiments, the wire is positioned near the sapphire part but not in contact with the sapphire part. In other implementations, the wire is placed in contact with the sapphire part. In some embodiments, the wire is formed in a shape that is complementary to a feature of the sapphire part. For example, if the target area of the part 101 in FIG. 1D is the groove 120, a wire having a similar size and/or shape as the groove 120 may be inserted into the groove 120. As another example, if the target area is the rounded edge 118, a wire mesh forming a curved surface having the same or similar radius as the rounded edge 118 (and configured to receive and the rounded edge 118) may be placed on or near the edge 118.

In some embodiments, treating the sapphire part in the localized area at operation 204 includes bombarding the localized area with ions to increase the temperature of the localized area to the second temperature (212). Bombarding an object with ions may be part of or similar to a plasma etching process. Specifically, the area desired to be strengthened/repaired can be bombarded with ions, which causes a local increase in temperature sufficient to heal the imperfections within the localized area of the sapphire part.

In some embodiments, treating the sapphire part in the localized area at operation 204 includes applying a chemical treatment to the localized area to increase the temperature of the localized area to the second temperature (214). For instance, the area desired to be strengthened/repaired can be chemically treated with a substance or combination of substances that cause a local increase in temperature sufficient to heal or remove the imperfections within the localized area of the sapphire part.

In some embodiments, after the part is heated in operation 202, and after the localized heat treatment is performed at operation 204, the part may be cooled. In some embodiments, the part is cooled at or slower than a particular cooling rate (e.g., at or below 0.25° C. per minute, 0.5° C. per minute, 1° C. per minute, 3° C. per minute, 6° C. per minute, etc.). If a sapphire part is cooled too rapidly, it may negatively affect the part, for example, by causing undesirable recrystallization of the material, or even causing the part to break. In some embodiments, the part is cooled according to a multi-step cooling profile (e.g., cool to 1000° C. at 3° C. per minute, then cool from 1000° C. to 20° C. at 6° C. per minute, etc.).

Figure 3:
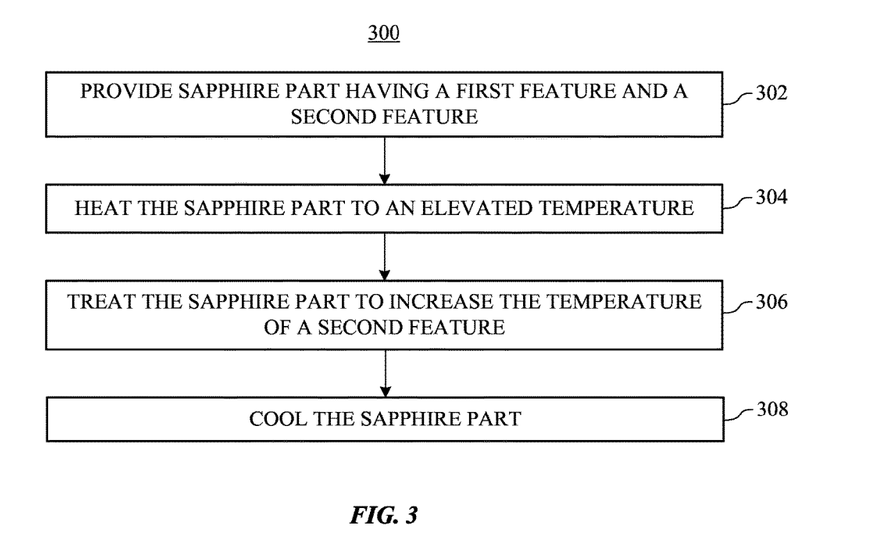
FIG. 3 depicts an example process for strengthening a sapphire part, in accordance with one embodiment of the present disclosure.

FIG. 3 illustrates a process 300 for strengthening and/or repairing a sapphire part. The process 300 may be used to strengthen or repair a part made of sapphire material, such as the cover sheets 101, 102, 103 described above, though the process 300 may be used to strengthen or repair other sapphire parts as well. As shown and described, the process 300 includes several steps. It will be understood that the process 300 may include more or fewer steps than those described. Moreover, in various embodiments, the steps may be reordered, combined, and/or omitted, and steps from other processes (e.g., processes 200, 400, 500) may be included in the process 300.

At operation 302, a sapphire part is provided. The sapphire part includes a first feature having a polished surface and a second feature having a surface that is rougher than the polished surface. For example, the first feature may be a substantially planar surface that corresponds to a touch surface of a display screen for an electronic device, and the second surface may be a mounting surface of the sapphire part that is configured to contact or mate to the electronic device. The planar surface may be polished using a lapping machine, or any other appropriate polishing process. In some cases, surfaces or portions of a sapphire part with which a user interacts or that are directly visible are highly polished, whereas surfaces that are hidden may be unpolished or polished to a lesser extent and, thus, may be rougher.

At operation 304, the sapphire part is heated at least to a uniform elevated temperature, wherein the elevated temperature is below a temperature that will degrade the polished surface. The elevated temperature for a particular part may be selected as described above with respect to FIG. 2. For example, the elevated temperature may be a certain amount less than a brittle-ductile transformation temperature, an annealing temperature, or any other temperature that that might damage a polished surface of a sapphire part. Moreover, the elevated temperature may be reached according to any appropriate heating/cooling profile, as mentioned above (e.g., heating directly to the elevated temperature, heating beyond the elevated temperature and then cooling to the elevated temperature, heating to an intermediate temperature and then further heating to the elevated temperature, etc.).

At operation 306, while the part is being heated or is heated as a result of the heating operation 304, the second feature of the sapphire part is treated to increase the temperature of the second feature above the elevated temperature. In some embodiments, the second feature is treated using any appropriate localized heat treating process and/or apparatus. For example, as described above with respect to operations 206-214, the second feature may be treated with a laser, a flame polisher, a thermal wire, a plasma etching device, or a chemical treatment.

At operation 308, the sapphire part is cooled (e.g., to ambient temperature), thereby strengthening the second feature without degrading the polished surface of the first feature. As a result of the process described with respect to FIG. 3, the roughness of the second feature may also be decreased. For example, the second feature may include a machined surface having a certain roughness. As a result of the localized heat treatment of the second feature, the roughness of the machined surface may be decreased, resulting in a higher degree of polish on the machined surface.

Figure 4:
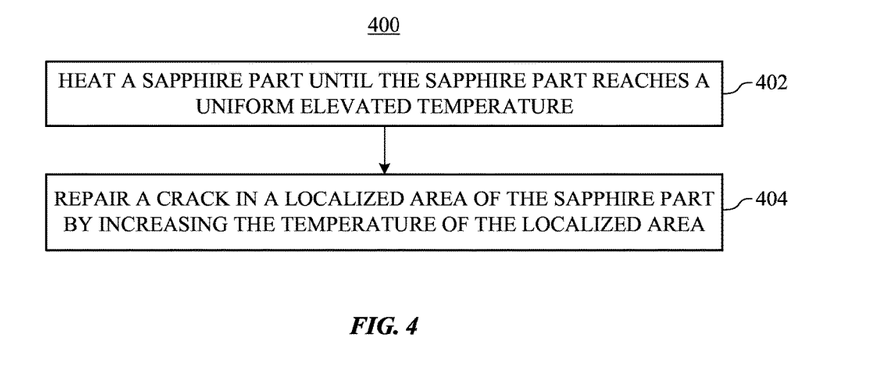
FIG. 4 depicts an example process for repairing a sapphire part, in accordance with one embodiment of the present disclosure.

FIG. 4 illustrates a process 400 for strengthening and/or repairing a sapphire part. The process 400 may be used to strengthen or repair a part made of sapphire material, such as the cover sheets 101, 102, 103 described above, though the process 400 may be used to strengthen or repair other sapphire parts as well. As shown and described, the process 400 includes several steps. It will be understood that the process 400 may include more or fewer steps than those described. Moreover, in various embodiments, the steps may be reordered, combined, and/or omitted, and steps from other processes (e.g., processes 200, 300, 500) may be included in the process 400.

At operation 402, a sapphire part is heated in a heated furnace at least until the sapphire part reaches a uniform elevated temperature. The elevated temperature for a particular part may be selected as described above with respect to FIG. 2. For example, the elevated temperature may be a certain amount less than a brittle-ductile transformation temperature, an annealing temperature, or any other temperature that that might damage a feature of a sapphire part. Moreover, the elevated temperature may be reached according to any appropriate heating/cooling profile, as mentioned above (e.g., heating directly to the elevated temperature, heating beyond the elevated temperature and then cooling to the elevated temperature, heating to an intermediate temperature and then further heating to the elevated temperature, etc.).

At operation 404, a crack in a localized area of the sapphire part is repaired by treating the localized area of the sapphire part to increase the temperature of the sapphire part in the localized area to a temperature that is above the elevated temperature and above a brittle-ductile transformation temperature of the sapphire part. In some embodiments, the second feature is treated using any appropriate localized heat treating process and/or apparatus. For example, as described above with respect to operations 206-214, the second feature may be treated with a laser, a flame polisher, a thermal wire, a plasma etching device, or a chemical treatment.

Figure 5:
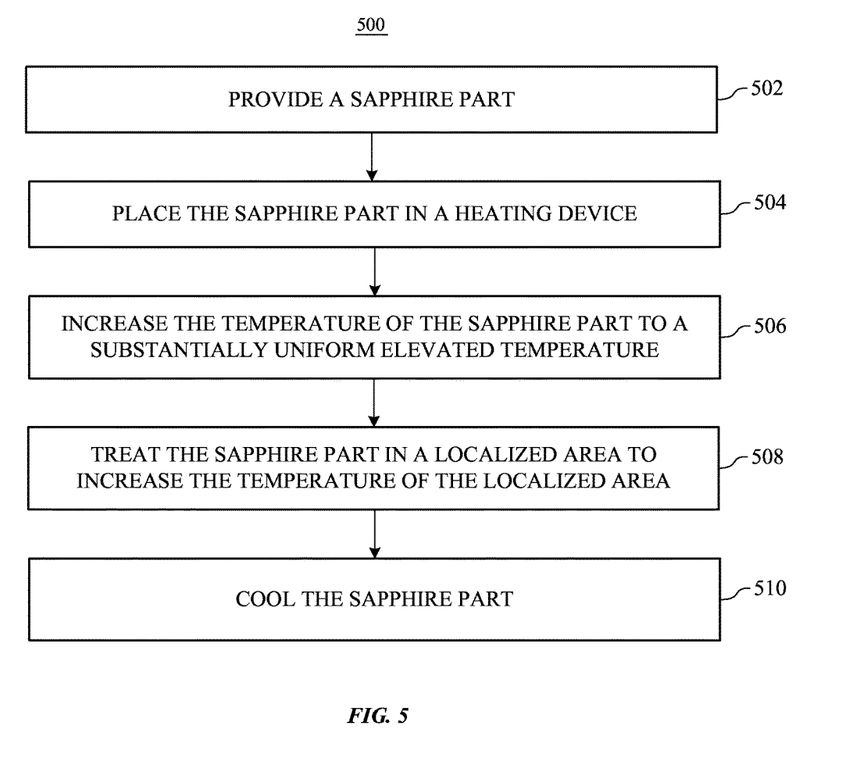
FIG. 5 depicts an example process for manufacturing a portable electronic device with a strengthened sapphire part, in accordance with one embodiment of the present disclosure.

FIG. 5 illustrates a process 500 for strengthening a sapphire part. The process 500 may be used to strengthen or repair a part made of sapphire material, such as the cover sheets 101, 102, 103 described above, though the process 500 may be used to strengthen or repair other sapphire parts as well. As shown and described, the process 500 includes several steps. It will be understood that the process 500 may include more or fewer steps than those described. Moreover, in various embodiments, the steps may be reordered, combined, and/or omitted, and steps from other processes (e.g., processes 200, 300, 400) may be included in the process 500.

At operation 502, a sapphire part at an ambient temperature is provided. At operation 504, the sapphire part is placed in a heating device, such as a furnace. At operation 506, the temperature of the sapphire part is increased, in the heating device, to a substantially uniform elevated temperature. The elevated temperature for a particular part may be selected as described above with respect to FIG. 2. For example, the elevated temperature may be a certain amount less than a brittle-ductile transformation temperature, an annealing temperature, or any other temperature that that might damage a feature of a sapphire part. Moreover, the elevated temperature may be reached according to any appropriate heating/cooling profile, as mentioned above (e.g., heating directly to the elevated temperature, heating beyond the elevated temperature and then cooling to the elevated temperature, heating to an intermediate temperature and then further heating to the elevated temperature, etc.).

At operation 508, while the temperature of the sapphire part is at the substantially uniform elevated temperature (e.g., while the sapphire part is being heated or is heated as a result of operation 506), the sapphire part is treated in a localized area to increase the temperature of the sapphire part in the localized area to a temperature that is above the elevated temperature. In some embodiments, the second feature is treated using any appropriate localized heat treating process and/or apparatus. For example, as described above with respect to operations 206-214, the second feature may be treated with a laser, a flame polisher, a thermal wire, a plasma etching device, or a chemical treatment.

In some embodiments, the temperature of the localized area is increased to a second temperature. The second temperature may be determined as described above with reference to FIG. 2.

At operation 510, the sapphire part is cooled to the ambient temperature, thereby strengthening the sapphire part within the localized area. In some embodiments, the sapphire part is cooled according to a particular cooling profile and/or cooling rate. For example, the sapphire part may be cooled at or slower than a particular cooling rate (e.g., at or below 0.25° C. per minute, 0.5° C. per minute, 1° C. per minute, etc.). In some embodiments, the part is cooled according to a multi-step cooling profile (e.g., cool to 300° C. at 0.25° C. per minute, then cool to 20° C. at 2° C. per minute, etc.).

In some embodiments, after operation 510, the sapphire part is attached to the portable electronic device (512) (e.g., to the front of the portable electronic device). For example, the sapphire part may be a protective cover sheet, such as protective cover sheet 101, 102. The protective cover sheet may include a surface that forms a touch surface of a display screen for the electronic device.

In some cases, the sapphire part is removed from the heating device after increasing the temperature of the sapphire part in the heating device (operation 506) and prior to treating the sapphire part in the localized area (operation 508).

In some cases, the sapphire part is removed from the heating device after the sapphire part is treated in the localized area (operation 508) and prior to attaching the sapphire part to the portable electronic device (operation 512).

In some cases, the sapphire part is removed from the heating device after the sapphire part is cooled (operation 510) and prior to attaching the sapphire part to the portable electronic device (operation 512).

3. Systems for Strengthening Sapphire Parts

Figure 6:
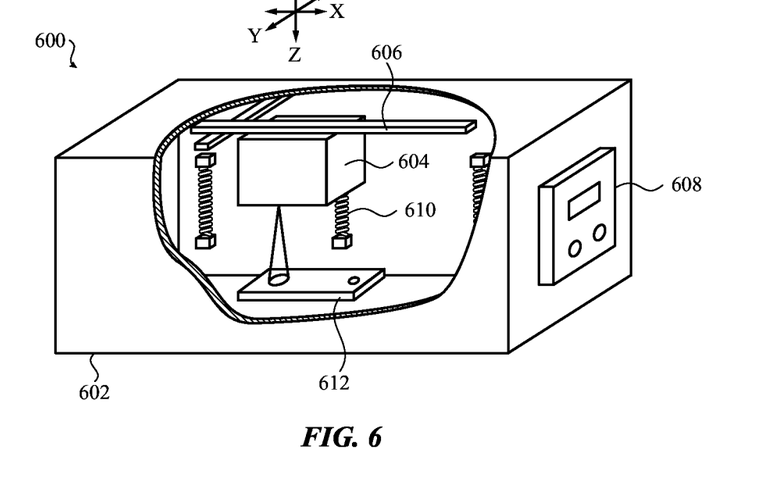
FIG. 6 depicts a schematic view of an exemplary system for strengthening a sapphire part, in accordance with one embodiment of the present disclosure.

FIG. 6 depicts a schematic representation of a system that can be used to strengthen a sapphire part. In particular, the system 600 depicted in FIG. 6 can be used to strengthen a sapphire part in accordance with processes described above with respect to FIGS. 2-6.

As shown in FIG. 6, system 600 includes a heating device 602 (e.g., a furnace), and a localized heating/treatment device 604, wherein both 602, 604 operate on a sapphire part 612 (which may correspond to parts 101, 102, or 103) in order to strengthen the sapphire part. Heating device 602 may include one or more heating elements 610 for increasing the temperature inside the heating device 602, and thus heating the sapphire part 612. While FIG. 6 depicts the sapphire part 612 located within the heating device 602 and also being treated with a localized heating/treatment device 604, the two operations may not be performed at the same time and/or at the same place. For example, the sapphire part 612 may be heated using the heating device 602 and then removed before subjecting the part to the localized heating/treatment device 604.

The system 600 also includes a controller 608 used to control the heating device 602 and localized heating/treatment device 604. In the present embodiment, the controller 608 includes a computer processor (e.g., a microcontroller) and computer memory for storing computer-readable instructions. The computer-readable instructions may be executed on the computer processor causing the system 600 to perform one or more of the processes described herein. The controller 608 also includes an input/output (I/O) for communicating with other elements of the system 600, including the heating device 602 and localized heating device 604.

Localized heating/treatment device 604 may take various forms. In one example, the localized treatment device 604 includes a laser. In another example, the localized treatment device 604 includes a flame polisher. In another example, the localized treatment device 604 includes a thermal wire positioned (or positionable) adjacent to the sapphire part. In another example, the localized treatment device 604 includes a plasma etching device. In another example, the localized treatment device 604 includes a chemical treatment device. In another example, localized treatment device 604 includes two or more of a laser, a flame polisher, a thermal wire, a plasma etching device, or a chemical treatment device.

The localized heating/treatment device 604 may include or be mounted to a positioning mechanism that enables the localized treatment device 604 to apply heat treatment to any portion of the part being treated. For example, in some embodiments, the localized treatment device 604 includes a heat treatment instrument (e.g., any of a laser, a flame polisher, a thermal wire, a plasma etching device, or a chemical treatment device, or a portion of any of the foregoing devices, such as a nozzle, tip, lens, etc.) that is mounted to an x-y or x-y-z gantry robot 606 (e.g., a fixture that is configured to hold a heat treatment instrument and that is capable of being moved along one or more axes by motors, actuators, or the like). Accordingly, the treatment device 604 can move the heat treatment instrument (or a portion thereof) into the proper orientation and/or position to treat a particular localized area. In some embodiments, the heat treatment instrument is mounted to an aiming device, such as an articulated robotic arm, that orients the heat treatment instrument as desired to treat a particular localized area.

Operation of the system 600 may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While any methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

What is claimed is:

1. A method of strengthening a component formed from a sapphire material, comprising:
   heating the component to a substantially uniform elevated temperature, the elevated temperature being from a brittle-ductile transformation temperature of the sapphire material to 10 percent below the brittle-ductile transformation temperature and the component having a thickness of 1 mm or less; and
   before the component cools below a first temperature, treating the component in a localized area to increase the temperature of the component in the localized area to a second temperature greater than the brittle-ductile transformation temperature, thereby strengthening the component within the localized area.

2. The method of claim 1, wherein, while treating the component in the localized area, a temperature gradient between the localized area and a remainder of the component is from 100° C. to 1000° C.

3. The method of claim 2, wherein the temperature gradient is from 100° C. to 500° C.

4. The method of claim 2, wherein the component includes a first feature and a second feature, the second feature being located in the localized area and having a surface that is rougher than a surface of the first feature.

5. The method of claim 4, wherein the second temperature is at or below a melting point of the sapphire material.

6. The method of claim 1, wherein treating the component in the localized area includes directing a laser beam onto the localized area in order to increase the temperature of the localized area to the second temperature.

7. The method of claim 1, wherein treating the component in the localized area includes applying a flame to the localized area in order to increase the temperature of the localized area to the second temperature.

8. The method of claim 1, wherein treating the component in the localized area includes placing a hot wire adjacent to the localized area to increase the temperature of the localized area to the second temperature.

9. The method of claim 1, wherein treating the component in the localized area includes bombarding the localized area with ions to increase the temperature of the localized area to the second temperature.

10. The method of claim 1, wherein treating the component in the localized area includes applying a chemical treatment to the localized area to increase the temperature of the localized area to the second temperature.

11. A method of strengthening a component for a mobile electronic device, the component formed from a sapphire material, comprising:
    providing a component having a thickness of 1 mm or less and formed from a sapphire material that includes a first feature having a polished surface and a second feature having a surface that is rougher than the polished surface;
    heating the component at least to a uniform first elevated temperature, the first elevated temperature being from a brittle-ductile transformation temperature of the first feature to 10 percent below the brittle-ductile transformation temperature;
    treating the second feature of the component to increase the temperature of the second feature to a second elevated temperature at or above an annealing temperature for the second feature, the first elevated temperature being 100° C. to 500° C. less than the second elevated temperature; and
    cooling the component to an ambient temperature, thereby strengthening the second feature.

12. The method of claim 11, wherein the first feature comprises a substantially planar surface.

13. The method of claim 12, wherein the first feature corresponds to a touch surface of a display screen for an electronic device.

14. The method of claim 13, wherein the second feature corresponds to a mounting feature of the component.

15. The method of claim 11, further comprising, as a result of performing the method, the roughness of the surface of the second feature is decreased.

16. A method of repairing a component formed from a sapphire material, comprising:
    heating the component in a heated furnace at least until the component reaches a uniform elevated temperature, the elevated temperature being from a brittle-ductile transformation temperature of the component to 10 percent below the brittle-ductile transformation temperature of the component and a thickness of the component being 1 mm or less; and
    repairing a crack in a localized area of the component by treating the localized area of the component to increase the temperature of the component in the localized area to a temperature that is above the elevated temperature.

17. A method of manufacturing a portable electronic device comprising:

provide a component formed from a sapphire material and having a thickness of 1 mm or less, placing the component in a heating device;

increasing the temperature of the component, in the heating device, to a substantially uniform elevated temperature, the elevated temperature being from a brittle-ductile transformation temperature of the component to 10 percent below the brittle-ductile transformation temperature;

while the temperature of the component is at the substantially uniform elevated temperature, treating the component in a localized area to increase the temperature of the component in the localized area to a temperature that is above the elevated temperature and less than or equal to the melting temperature of the component such that a temperature gradient between the localized area and a remainder of the component is from 100° C. to 1000° C.; and cooling the component to an ambient temperature, thereby strengthening the component within the localized area.

18. The method of claim 17, further comprising attaching the component to a front of the portable electronic device.

19. The method of claim 17, further comprising, after increasing the temperature of the component in the heating device and prior to treating the component in the localized area, removing the component from the heating device.

20. The method of claim 17, further comprising, after treating the component in the localized area and prior to attaching the component to the front of the portable electronic device, removing the component from the heating device.

* * * * *